(12) United States Patent
Beck (10) Patent No.: US 7,036,802 B2
(45) Date of Patent: May 2, 2006

(54) SELF-PUMPING HYDROPNEUMATIC SUSPENSION STRUT

(75) Inventor: Hubert Beck, Eitorf (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/851,875

(22) Filed: May 21, 2004

(65) Prior Publication Data
US 2004/0262826 A1    Dec. 30, 2004

(30) Foreign Application Priority Data
Jun. 27, 2003    (DE)    ................................ 103 29 005

(51) Int. Cl.
*B60G 17/00* (2006.01)
(52) U.S. Cl. ................ 267/64.17; 267/64.19; 267/64.23; 267/64.26; 267/64.28
(58) Field of Classification Search ......... 267/64.17 O, 267/64.19 X, 64.23 X, 64.26 X, 64.28 X, 267/64.11, 64.13, 64.15, DIG. 2
See application file for complete search history.

(56) References Cited

U.S. PATENT DOCUMENTS

| | | | | | |
|---|---|---|---|---|---|
| 3,033,556 | A | * | 5/1962 | Wössner | .................. 267/64.19 |
| 3,218,052 | A | * | 11/1965 | Peterson | ..................... 267/126 |
| 4,502,672 | A | * | 3/1985 | Meller et al. | ............ 267/64.17 |
| 4,624,346 | A | * | 11/1986 | Katz | ....................... 188/282.9 |
| 5,062,616 | A | * | 11/1991 | Sommer | .................. 267/64.17 |
| 5,564,680 | A | * | 10/1996 | Sano et al. | ............... 267/64.17 |
| 6,648,309 | B1 | | 11/2003 | Beck | |
| 2002/0105118 | A1 | * | 8/2002 | Beck | ....................... 267/64.27 |

* cited by examiner

*Primary Examiner*—Melanie Torres
(74) *Attorney, Agent, or Firm*—Cohen, Pontani, Lieberman & Pavane (57) ABSTRACT

A suspension strut includes an outer tube having a first filling opening and a second filling opening, an intermediate wall received in the outer tube and separating a high pressure chamber from a low pressure chamber, a working cylinder located concentrically inside the outer tube in the high pressure chamber, and a gas filled separating envelope located between the working cylinder and the outer tube for pressurizing damping medium in the high pressure chamber. An axially displaceable piston divides the working cylinder into a first working space and a second working space, the first working space being connected to the high pressure chamber. A hollow piston rod passing through the second working space transports damping medium from the low pressure chamber to the first working space. A pump rod fixed to the intermediate wall and received in the hollow piston rod forms a pump cylinder, the pump rod having a suction tube extending into the low pressure chamber for transporting damping fluid from the low pressure chamber to the piston rod. A gas lock device fitted to suction tube prevents flow of gas from the low pressure chamber into the suction tube when the low pressure chamber is filled with damping medium and gas, and the suspension strut is vertically oriented with the low pressure chamber at the top.

6 Claims, 7 Drawing Sheets

SELF-PUMPING HYDROPNEUMATIC SUSPENSION STRUT

BACKGROUND OF THE INVENTION

1. Field of the Invention

The invention pertains to a self-pumping, hydropneumatic suspension strut with internal level control, especially for motor vehicles, having an outer tube having a first filling opening and a second filling opening, and an intermediate wall received in the outer tube, the intermediate wall separating a high pressure chamber from a low pressure chamber. The chambers each contain a damping medium, the first filling opening communicating with the low pressure chamber when the intermediate wall is not fully received in the outer tube and being closed by the intermediate wall when the intermediate wall is fully received in the outer tube. A working cylinder is located concentrically inside the outer tube in the high pressure chamber, and a gas filled separating envelope is located between the working cylinder and the outer tube for pressurizing the damping medium in the high pressure chamber. An axially displaceable piston divides the working cylinder into a first working space and a second working space, the first working space being connected to the high pressure chamber. A hollow piston rod supports the axially displaceable piston, the hollow piston rod passing through the second working space and transporting damping medium from the low pressure chamber to the first working space. A pump rod fixed to the intermediate wall and received in the hollow piston rod forms a pump cylinder, the pump rod having a suction tube extending into the low pressure chamber for transporting damping fluid from the low pressure chamber to the piston rod. A piston rod guide is fitted in the outer tube and receives the piston rod therethrough, the piston rod guide having a flow connection connected to the separating envelope. The flow connection communicates with the second filling opening when the piston rod guide is not fully received in the outer tube, and is closed by the outer tube when the piston rod guide is fully received in the outer tube.

2. Description of the Related Art

Suspension struts of the type in which an intermediate wall separates the high-pressure chamber for the low-pressure chamber, and in which a pump rod is attached to this intermediate wall, are already known (e.g., U.S. Pat. No. 6,648,309). This suspension strut can be installed in either of two different positions in a motor vehicle. That is, the piston rod can be inserted so that it extends either upward (FIG. 2) or downward (FIG. 1). In most cases, however, suspension struts of this type are installed on the chassis with the piston rod extending downward, whereas the housing is attached to the vehicle body. This is done to minimize the unsprung masses. It is quite problematic to manufacture this type of design, however, because it must be done horizontally (FIGS. 3 and 4 of U.S. Pat. No. 6,648,309). When the unit is to be filled with gas, the damping medium of the high-pressure chamber must be free to interchange with the damping medium of the low-pressure chamber via the open discharge bore so that the pressure can be equalized; during this process, the compressed gas may not pass from the low-pressure chamber into the pump space, for otherwise the pump itself will not be able to operate properly. In addition, the assembly of a suspension strut of the horizontal type entails a considerable amount of work both to fill the unit with gas and to install the internal parts in the outer tube. An assembly line for the production of suspension struts of the horizontal type therefore occupies a large amount of space.

Conventional suspension struts of a different design are assembled vertically (DE 44 12 842 A1). These suspension struts can be assembled easily, and the assembly equipment can be kept simple.

SUMMARY OF THE INVENTION

It is therefore the task of the present invention to create a self-pumping hydropneumatic suspension strut with internal level control which is favorably designed with respect to the unsprung masses and also with respect to the assembly process and the amount of work required to assemble it.

To accomplish this task, the pump rod projecting into the low-pressure chamber is provided according to the invention with a gas lock device.

It is advantageous here that the suspension strut can be filled in correspondence with its installation position and that it can also be mounted in the same position in the vehicle. It is also ensured here that the compressed gas cannot pass from the low-pressure chamber into the pump space during the filling process. This means not only that assembly can be carried out reliably but also that the suspension strut will function satisfactorily after installation.

In accordance with an essential feature, it is provided that one end of the pump rod projects into a cylindrical opening of a lock element and forms an opening before the complete axial insertion of the components. It is an advantage that, before final assembly, a flow connection is created, which is then tightly sealed after final assembly as a result of the axial insertion.

In accordance with another feature, it is provided that the lock element located on the end of the pump rod has a section of tubing, which extends into the area of the intermediate wall. The advantage here is that the tubing section, when installed in the appropriate position, always remains immersed in the damping medium of the low-pressure chamber, which prevents the compressed gas from escaping from the low-pressure chamber into the pump space.

In another embodiment, the pump rod is surrounded coaxially by a section of tubing and forms a channel, which extends from the end of the pump rod to a point near the intermediate wall. The advantage here is that the gas lock device can have a very simple design, in which merely an additional section of tubing is mounted coaxially around the end of the pump rod to form a flow connection, so that no compressed gas can pass into the pump space after installation in this design either.

To create multi-part gas lock device, it is provided that the end of the pump rod is sealed off by a cap.

To obtain a satisfactory seal, it is provided that an O-ring is provided as the sealing element.

To obtain a plug-in connection which brings itself into the appropriate working position during the assembly of the individual components, it is provided that the section of tubing is held in place on the pump rod by a nonpositive and/or a positive type of connection.

The bottom of the housing of the suspension strut is used to hold the gas lock device in place properly at the end of the pump rod. That is, as the piston rod guide is being inserted in the axial direction, the gas lock device comes into contact with the bottom of the outer tube. The lock device then arrives in its working position as the piston rod guide is inserted axially the rest of the way.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
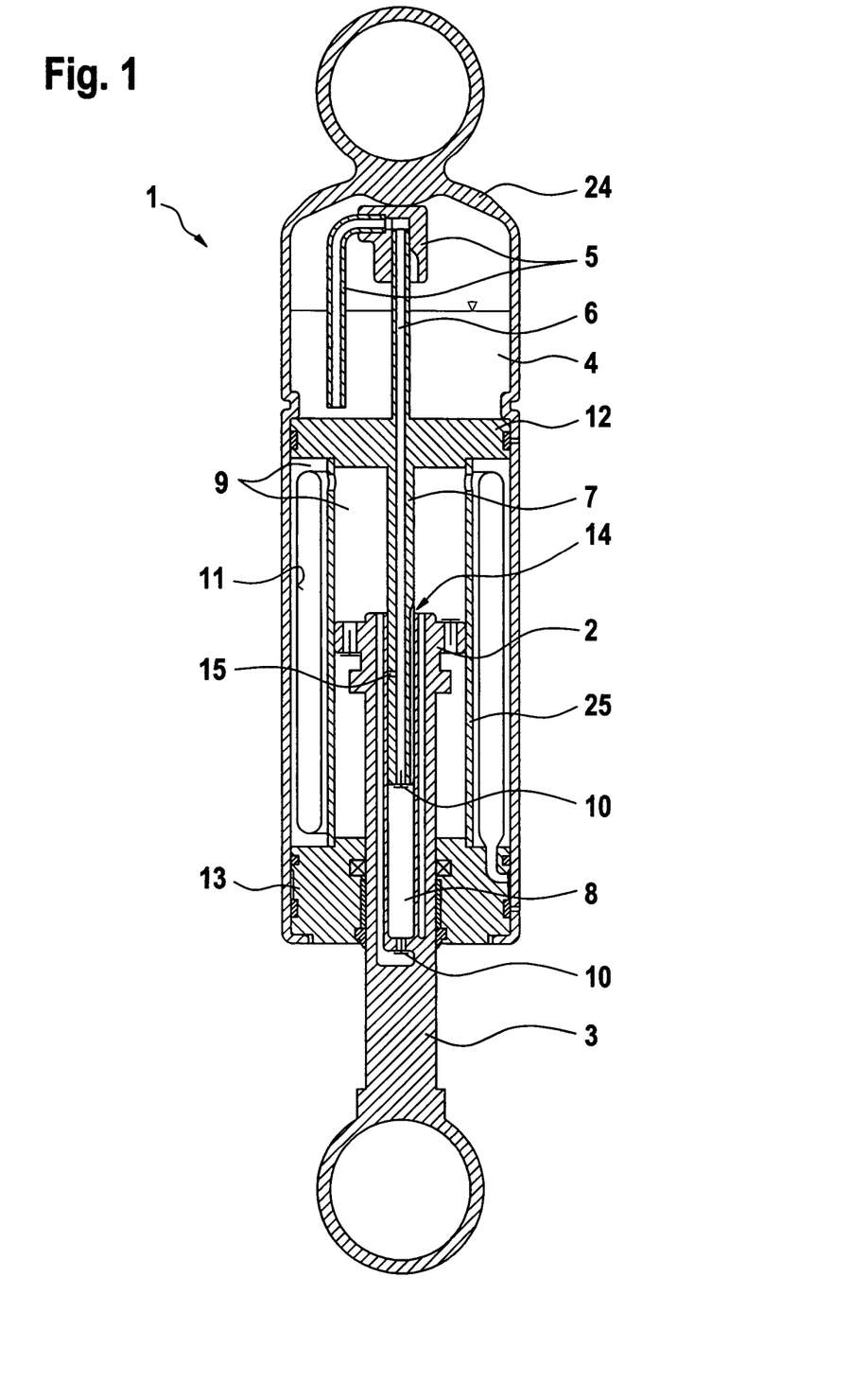
FIG. 1 shows a cross section of a suspension strut as a whole.

The self-pumping hydropneumatic suspension strut 1 shown in FIG. 1 includes on outer tube 30, a working cylinder 25, and a damping piston 2 mounted on the piston rod 3. The piston 2 divides the working cylinder 25 into two working spaces. In the axial direction, an intermediate wall 12 forms the boundary between a high-pressure chamber 9 and a low-pressure chamber 4. The high pressure chamber 9 includes an outer part which is pressurized by a compressed gas in a separating envelope 11, and an inner part formed by the working spaces. The inner and outer parts communicate via passages 31 in the working cylinder 25, so that they are at the same pressure. In the low-pressure chamber 4, the compressed gas and damping medium are both present, no separate measures being taken to keep them apart.

The suspension strut 1 in FIG. 1 is shown in the position it will occupy after installation in the vehicle; that is, the piston rod 3 carrying the damping piston 2 is directed downward. The inward and outward travel of the piston rod 3 causes damping medium to be transported from the low-pressure chamber 4 via the gas lock device 5, i.e., the suction tube 6 and the pump rod 7, into the pump space 8, and from there the damping medium is sent on to the high-pressure chamber 9. The transport of damping medium is guaranteed by the nonreturn valves 10. The low-pressure chamber 4 and the high-pressure chamber 9 are filled both with damping medium and with gas, and a separating envelope 11 in the high-pressure chamber 9 separates the damping medium from the compressed gas. An intermediate wall 12 separates the high-pressure chamber 9 from the low-pressure chamber 4 and also holds the pump rod 7 in place. A piston rod guide 13 seals off the suspension strut 1 against the atmosphere. The suspension strut is controlled by the bypass 14 and by the discharge bore 15, which are responsible for the dynamic level control; the travel-dependent release of the discharge bore 15 has the effect of equalizing the pressure between the high-pressure and the low-pressure chambers 9, 4. The bypass 14 acts in a direct travel-dependent manner and allows the vehicle body to find its own level; it prevents the vehicle body from being pumped up any higher, because, as a result of a pressure equalization in the pump space 8 when the bypass 14 is open, the same pressure is also present in the high pressure chamber 9 and the low pressure chamber 4.

Figure 2:
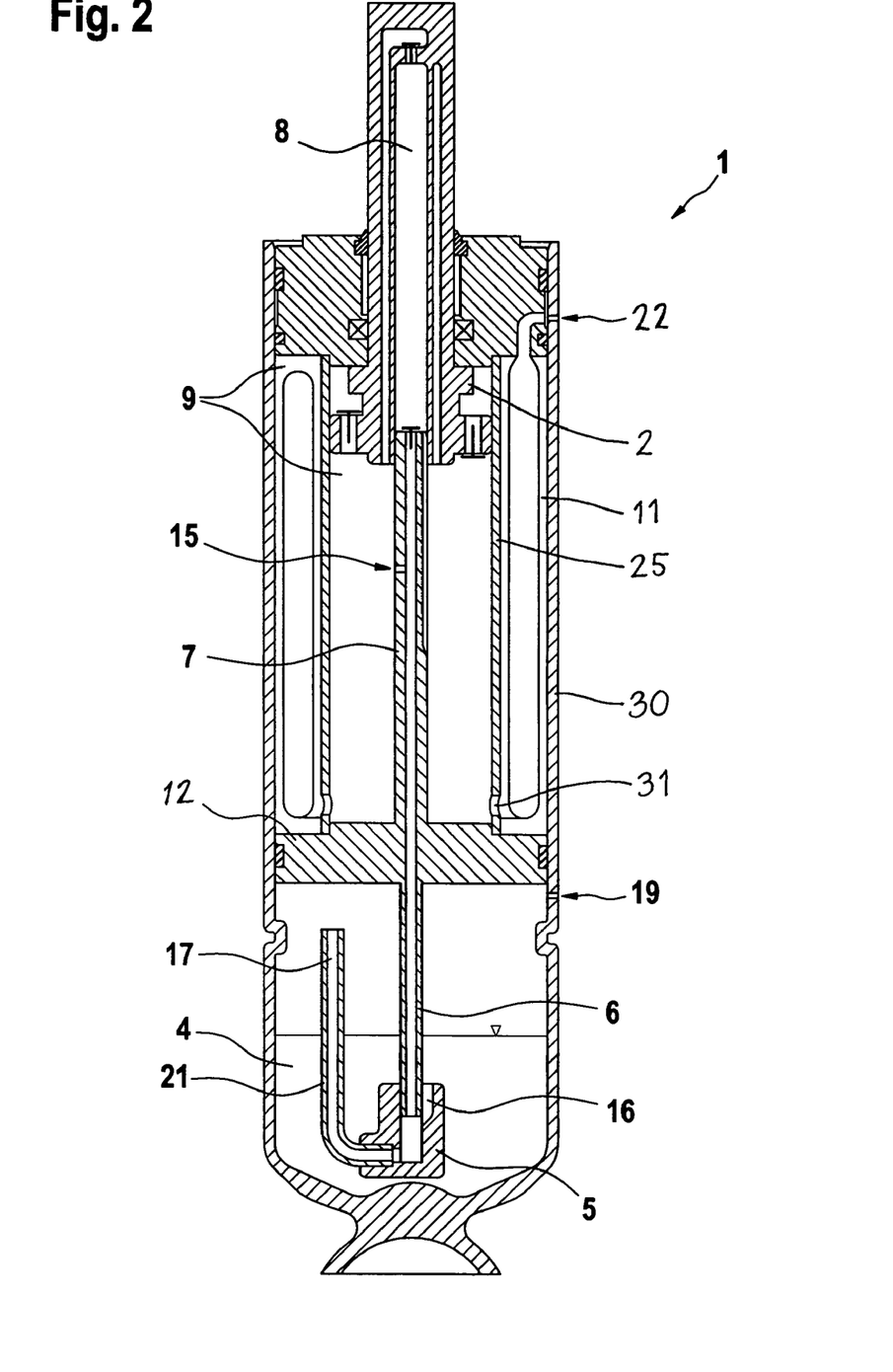
FIGS. 2 and 3 show cross sections of the individual steps by which the suspension strut and the gas lock device are assembled.

FIG. 2 shows the suspension strut 1, filled with both damping medium and pressurized gas, in its assembly position. All of the internal parts are brought into the positions shown during the filling process, and they are prevented from escaping from the housing by a hold-down device in the assembly machine (not shown). First, a portion of the damping medium is loaded into the low-pressure chamber 4; then the internal parts 5, 6, 7, and 12 are introduced into the housing outer tube 30, and the remaining portion of the damping medium is added to the high-pressure chamber 9. By inserting the internal parts farther inward in the axial direction, the situation shown in FIG. 2 is obtained. The compressed gas is now supplied through the first filling opening 19 in the low-pressure chamber 4, and the second filling opening 22 in the high-pressure chamber 9. Thus the low-pressure chamber 4 and the high-pressure chamber 9 are filled with the correct total amounts of both damping medium and gas, but the damping medium has still not been distributed appropriately within the suspension strut 1. As a result of the internal pressure now prevailing in the suspension strut 1, the damping piston 2 is pushed outward, and it thus opens the discharge bore 15. The pressure can thus equalize itself through the discharge bore 15 and the pump rod 7, so that the gas and the damping medium are distributed into the correct chambers in correspondence with the surface areas upon which the pressure acts. No pressurized gas may be allowed to enter the pump rod 7 or the pump space 8, however, because otherwise problems will occur when the pump is tested. To prevent such entry, a gas lock device 5 has been provided for this suspension strut 1; this lock device is attached to the bottom end of the pump rod 7, i.e., of the suction tube 6, and is immersed in the damping medium. The gas lock device 5 has a closable opening 16 in the area of the damping medium; through this opening, the damping medium can flow to the discharge bore 15. The pressure in the channel 17 has been equalized, so that no compressed gas can flow through it.

Figure 3:
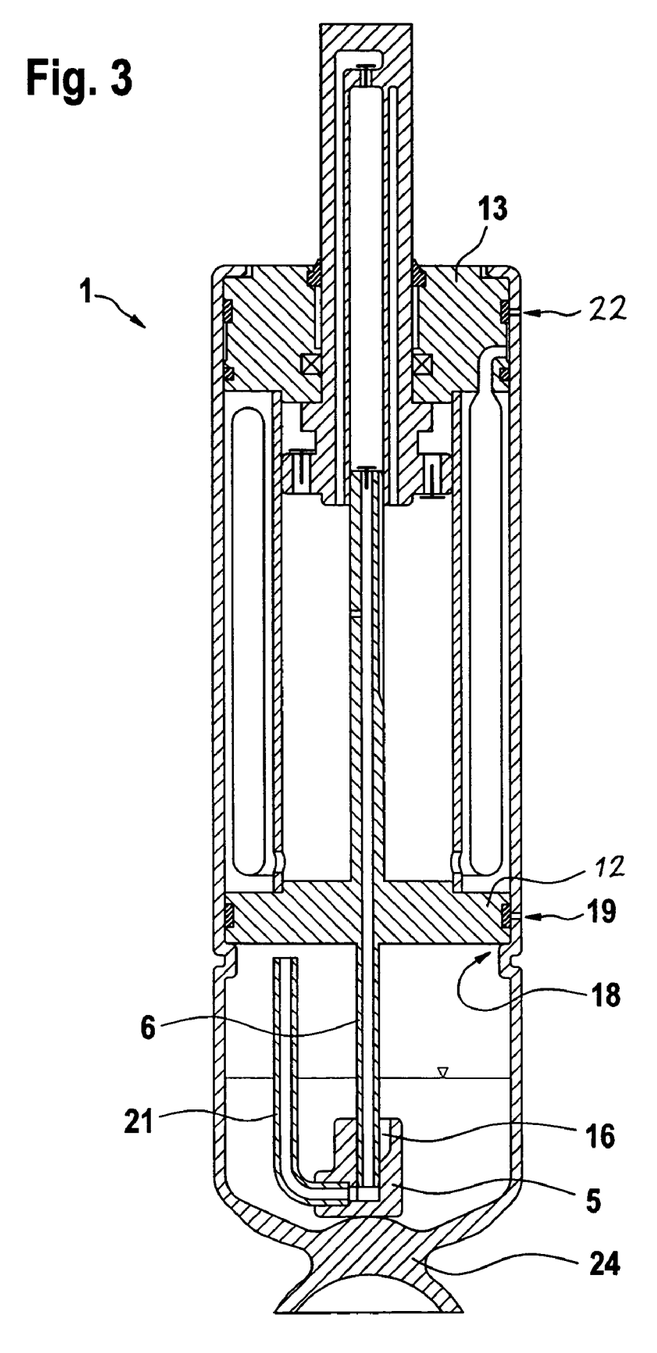

FIG. 3 shows the suspension strut 1 after all of the internal parts have been inserted axially all the way to the stop 18 and after the two filling bores 19 and 22 have been blocked off by an appropriate seal in the intermediate wall 12 and an appropriate seal in the piston rod guide 13. The outer tube is deformed in the area of the piston rod guide 13 by a partial or complete flanging operation to form a nonpositive connection.

As a result of this axial insertion of the internal parts, the closable opening 16 in the gas lock device 5 is also closed when the gas lock device 5 hits the bottom 24 of the suspension strut. Contact with the bottom of the unit causes the suction tube 6 to move into the gas lock device until the closable opening 16 has been sealed off.

The suspension strut 1 is then rotated to the position of FIG. 1, so that it can be installed in the vehicle; thus the piston rod 3 is now pointing downward. The damping medium is present in the low-pressure chamber 4 next to the intermediate wall 12, and the area of the gas lock device 5 is surrounded by pressurized gas. The end of the channel 17 in the form of a section of tubing 21 is now immersed in the damping medium, and the compressed gas in the upper area of the low-pressure chamber 4 cannot pass into the pump space 8. The gas lock device 5 thus prevents any compressed gas from being drawn into the pump space during the operation of the vehicle.

Figure 4:
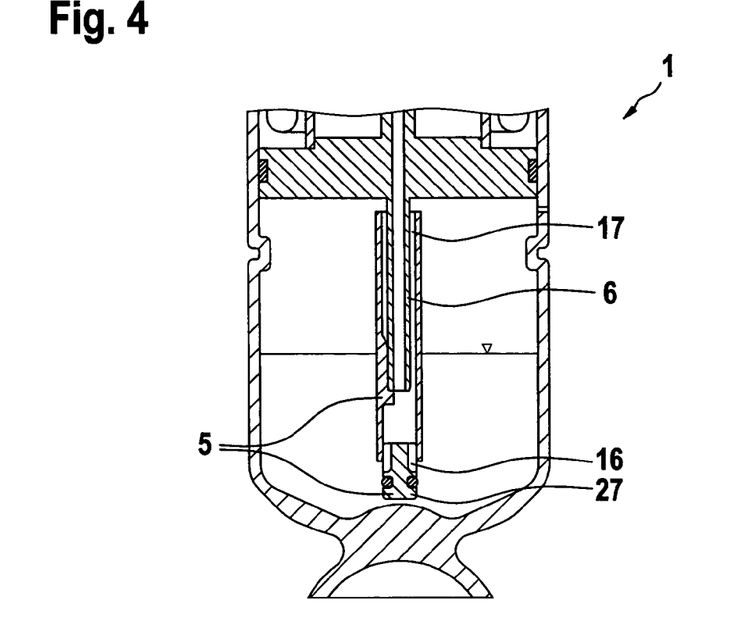
FIGS. 4–7 show a cross section of a variant of the individual parts of a gas lock device.
Figure 5:
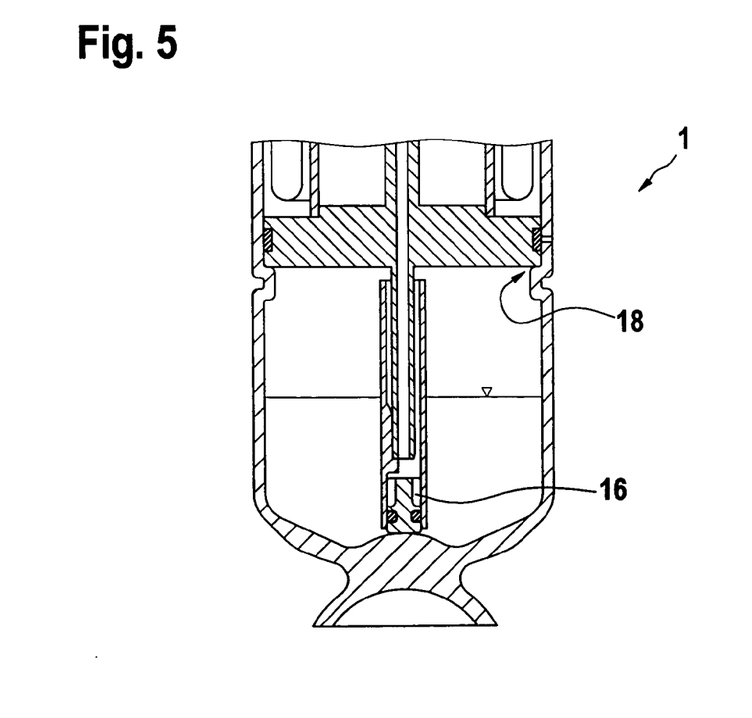

Additional variants of a gas lock device 5 are shown in FIGS. 4 and 5. These devices are located at the end of the suction tube 6. Here, too, the damping medium can rise through the closable opening 16 in the suction tube 6 during the gas-filling process, and because the closable opening 16 is still open at this point, the suction channel 17 is at the same pressure. After the internal parts have come to rest against the stop 18 (FIG. 5), the closable openings 16 are closed, and the suspension strut 1 can be turned around and installed in the vehicle. It will then operate in this same position.

Figure 6:
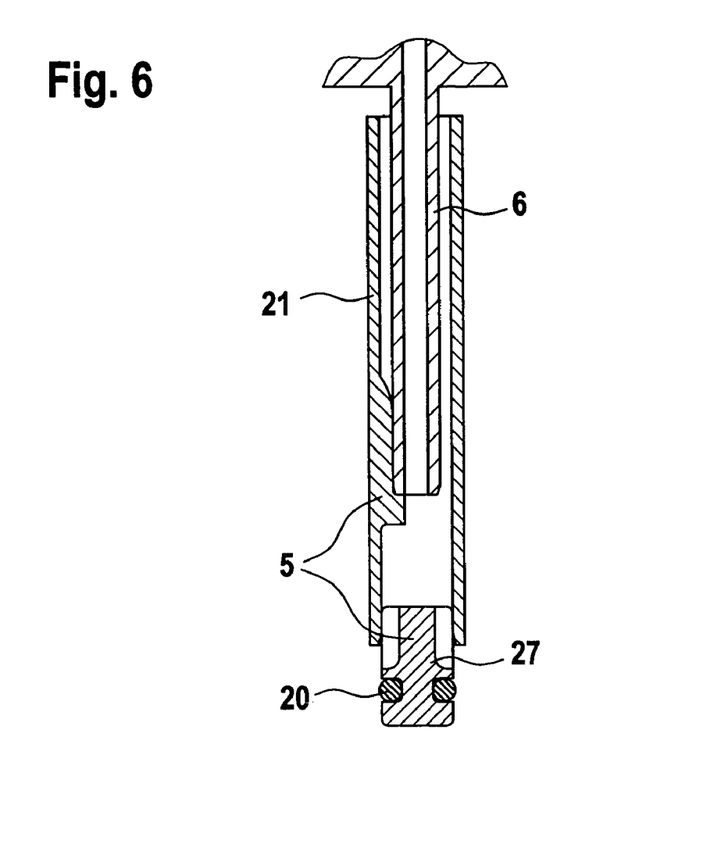
Figure 7:
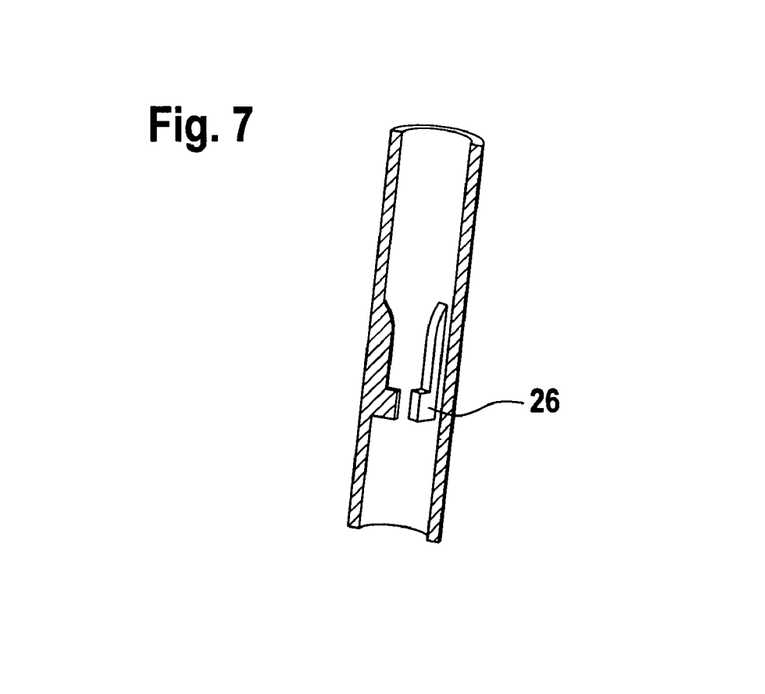
Figure 8:
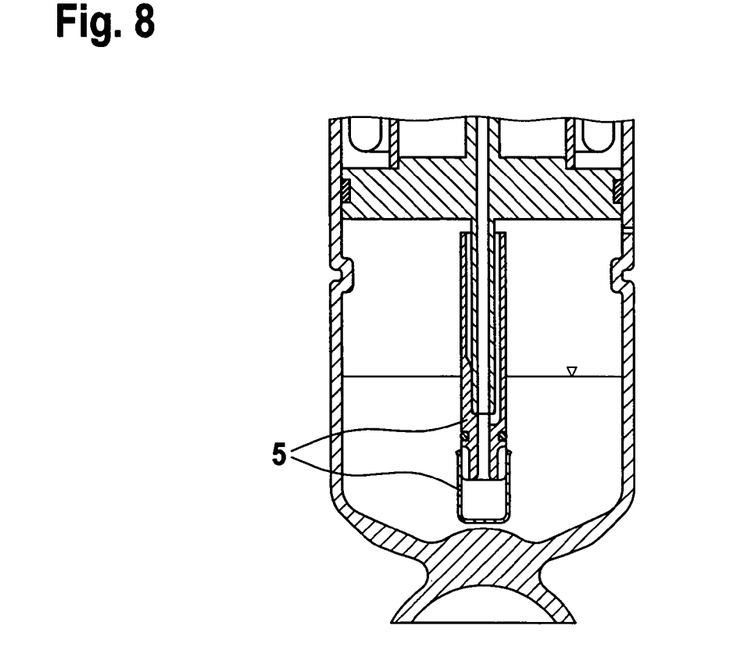
FIGS. 8–11 show a cross section of the details of another embodiment of a gas lock device.
Figure 9:
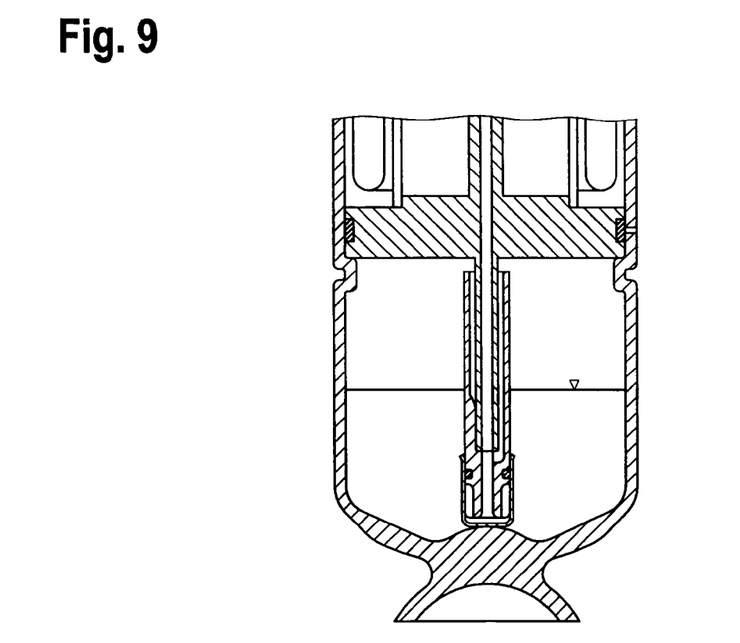
Figure 10:
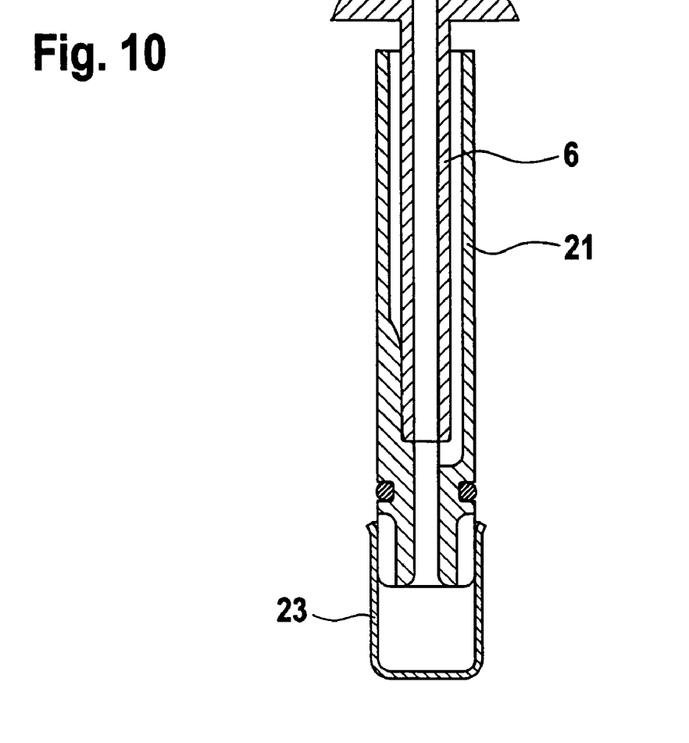
Figure 11:
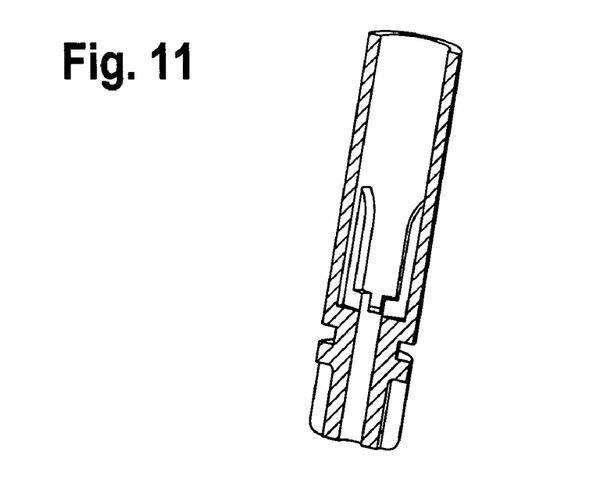

FIGS. 6 and 7 show a detailed view of the gas lock device 5 of FIGS. 4 and 5. The suction tube 6 is surrounded coaxially by a section of tubing 21. When the components are inserted axially, the retaining device 26 will hold the tube section 21 in place with respect to the suction tube 6. A sealing part 27 blocks off the bottom end of the suction tube 6.

The bottom end of the suction tube 6, i.e., of the tube section 21, is sealed off in FIGS. 8–11 by an appropriately designed cap 23. Otherwise, this gas lock device 5 is comparable to the exemplary embodiments of FIGS. 4–7.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self-pumping hydropneumatic suspension strut with internal level control, said strut comprising:
    an outer tube having a first filling opening and a second filling opening;
    an intermediate wall received in said outer tube, said intermediate wall separating a high pressure chamber from a low pressure chamber, said chambers each containing a damping medium, said first filling opening communicating with said low pressure chamber when said intermediate wall is not fully received in said outer tube and being closed by said intermediate wall when said intermediate wall is fully received in said outer tube;
    a working cylinder located concentrically inside said outer tube in said high pressure chamber,
    a gas filled separating envelope located between said working cylinder and said outer tube for pressurizing said damping medium in said high pressure chamber;
    an axially displaceable piston which divides said working cylinder into a first working space and a second working space, said first working space being connected to the high pressure chamber;
    a hollow piston rod which supports said axially displaceable piston, said hollow piston rod passing through said second working space and transporting damping medium from said low pressure chamber to said first working space;
    a pump rod fixed to said intermediate wall and received in said hollow piston rod to form a pump cylinder, said pump rod comprising a suction tube extending into said low pressure chamber for transporting damping fluid from said low pressure chamber to said piston rod;
    a piston rod guide fitted in said outer tube and receiving said piston rod therethrough, said piston rod guide having a flow connection connected to said separating envelope, said flow connection communicating with said second filling opening when said piston rod guide is not fully received in said outer tube and being closed by said outer tube when said piston rod guide is fully received in said outer tube;
    a gas lock device fitted to said suction tube in said low pressure chamber, wherein said gas lock comprises a lock element having a closable opening, said suction tube being received in said lock element so that said closable opening remains open until said intermediate wall is fully received in said outer tube, said gas lock preventing flow of gas from said low pressure chamber into said suction tube when said low pressure chamber is filled with damping medium and gas, and said suspension strut is vertically oriented with said low pressure chamber at the top; and
    a section of tubing surrounding said suction tube coaxially to form a channel which extends toward the intermediate wall.

2. The self-pumping hydropneumatic suspension strut of claim 1, wherein said tubing extends from said lock element toward said intermediate wall.

3. The self-pumping hydropneumatic suspension strut of claim 1, wherein said section of tubing is held in place on said suction tube by a nonpositive connection.

4. The self-pumping hydropneumatic suspension strut of claim 1, wherein said outer tube has a bottom against which said gas lock device is supported as said intermediate wall and said piston rod guide are fully received in said outer tube.

5. A self-pumping hydropneumatic suspension strut with internal level control, said strut comprising:
    an outer tube having a first filling opening and a second filling opening;
    an intermediate wall received in said outer tube, said intermediate wall separating a high pressure chamber from a low pressure chamber, said chambers each containing a damping medium, said first filling opening communicating with said low pressure chamber when said intermediate wall is not fully received in said outer tube and being closed by said intermediate wall when said intermediate wall is fully received in said outer tube;
    a working cylinder located concentrically inside said outer tube in said high pressure chamber,
    a gas filled separating envelope located between said working cylinder and said outer tube for pressurizing said damping medium in said high pressure chamber;
    an axially displaceable piston which divides said working cylinder into a first working space and a second working space, said first working space being connected to the high pressure chamber;
    a hollow piston rod which supports said axially displaceable piston, said hollow piston rod passing through said second working space and transporting damping medium from said low pressure chamber to said first working space;
    a pump rod fixed to said intermediate wall and received in said hollow piston rod to form a pump cylinder, said pump rod comprising a suction tube extending into said low pressure chamber for transporting damping fluid from said low pressure chamber to said piston rod;

a piston rod guide fitted in said outer tube and receiving said piston rod therethrough, said piston rod guide having a flow connection connected to said separating envelope, said flow connection communicating with said second filling opening when said piston rod guide is not fully received in said outer tube and being closed by said outer tube when said piston rod guide is fully received in said outer tube said suction tube having an end fitted with a cap, said cap closing off said end in a leak-tight manner when said intermediate wall is fully received in said outer tube; and a gas lock device fitted to said suction tube in said low pressure chamber, said gas lock preventing flow of gas from said low pressure chamber into said suction tube when said low pressure chamber is filled with damping medium and gas, and said suspension strut is vertically oriented with said low pressure chamber at the top.

6. The self-pumping hydropneumatic suspension strut of claim 5, further comprising an O-ring between said suction tube and said cap.

* * * * *